United States Patent [19]
McDade

[11] Patent Number: 6,121,916
[45] Date of Patent: Sep. 19, 2000

[54] METHOD AND APPARATUS FOR RECOGNIZING STATIONARY OBJECTS WITH A MOVING SIDE-LOOKING RADAR

[75] Inventor: James C. McDade, Poway, Calif.

[73] Assignee: Eaton-VORAD Technologies, L.L.C., San Diego, Calif.

[21] Appl. No.: 09/356,251

[22] Filed: Jul. 16, 1999

[51] Int. Cl.[7] .............................. G01S 13/93; G01S 13/52
[52] U.S. Cl. .............................. 342/70; 342/71; 342/114; 342/115
[58] Field of Search .................... 342/70, 71, 72, 342/114, 115, 160, 162, 196

[56] References Cited

U.S. PATENT DOCUMENTS

| | | | |
|---|---|---|---|
| 4,349,823 | 9/1982 | Tagami et al. | 343/7 VM |
| 4,845,506 | 7/1989 | Shibata et al. | 343/713 |
| 4,885,590 | 12/1989 | Hsan | 342/196 |
| 4,929,952 | 5/1990 | Schneider et al. | 342/184 |
| 5,087,918 | 2/1992 | May et al. | 342/85 |
| 5,280,288 | 1/1994 | Sherry et al. | 342/83 |
| 5,302,956 | 4/1994 | Asbury et al. | 342/70 |
| 5,325,096 | 6/1994 | Pakett | 342/70 |
| 5,339,075 | 8/1994 | Abst et al. | 340/903 |
| 5,402,129 | 3/1995 | Gellner et al. | 342/70 |
| 5,530,447 | 6/1996 | Henderson et al. | 342/70 |
| 5,670,962 | 9/1997 | Henderson et al. | 342/70 |
| 5,714,927 | 2/1998 | Henderson et al. | 340/435 |

*Primary Examiner*—John B. Sotomayor
*Attorney, Agent, or Firm*—Jaquez & Associates; Martin J. Jaquez, Esq.; Allan Y. Lee, Esq.

[57] ABSTRACT

A radar system including a means for distinguishing signals returned from (i.e., reflected by) objects that are stationary with respect to earth (i.e., "stationary objects") from signals returned from objects that are moving along with a host vehicle (i.e., the vehicle upon which the radar system is mounted). The system includes a radar antenna having a relatively narrow beam width centered at a "squint" angle $\theta$. When the antenna is aimed such that the center of the beam is at a squint angle of $\theta=60°$, the Doppler frequency of signals that are reflected from targets that are stationary along the roadside is significantly higher than the frequency of signals reflected from targets that are in the blind spot to the right-rear of the host vehicle and which are moving along with the host vehicle.

23 Claims, 10 Drawing Sheets

METHOD AND APPARATUS FOR RECOGNIZING STATIONARY OBJECTS WITH A MOVING SIDE-LOOKING RADAR

BACKGROUND OF THE INVENTION

1. Field of the Invention

This invention relates to radar for detecting vehicles on a roadway, and more particularly to a side-looking radar system and method for distinguishing objects in a host vehicle's blind spot that are moving along with the host vehicle from objects that pass through the blind spot and are stationary with respect to earth.

2. Description of Related Art

It is critical for the safe operation of a motor vehicle that the operator of the vehicle be able to detect obstacles that are near the vehicle, but which are not easily directly observable from the driver's seat. Regions in which objects that are near a vehicle are not directly observable are commonly referred to as "blind spots". For example, the region between the angles of 90° and 170° measured with respect to the forward direction of a vehicle in a clockwise direction (i.e., generally to the right the vehicle and slightly behind the operator's seat) is typically a blind spot, particularly for large vehicles such as buses and trucks. Failure of an operator to be aware of an object (typically another vehicle) in this right-side blind spot when making a right-hand turn or a right lane change is a source of numerous accidents. Another common blind spot is the region directly to the rear of a vehicle. This region is of particular interest when the vehicle is in reverse gear (i.e., when "backing up").

The most common solution to the problem of blind spots has been to use mirrors to aid the operator of the vehicle in detecting the presence of obstacles that could pose a hazard. Such mirrors have been made in a variety of shapes and having a variety of lenses. In addition such mirrors have been mounted in various locations to provide the operator with the greatest ability to detect the presence of obstacles in particular blind spots. For example, concave mirrors are commonly mounted to the right side of a vehicle and aimed at the right-side blind spot. Mirrors provide the operator with some information regarding the presence of obstacles in a vehicle's blind spots. However, mirrors are less useful at night and under adverse weather conditions. Even in the best of conditions, mirrors that distort the reflection are typically required to allow the operator to view the right rear blind spot. Some operators find it difficult to properly interpret the image that is presented in such mirrors (such as convex mirrors that are commonly used as right side mirrors). Furthermore, mirrors tend to reflect the headlights of vehicles approaching from behind and thus blind the driver of the vehicle on which the mirror is fixed. Hence, a more complete and satisfactory solution is still sought by many.

One known alternative to the use of mirrors to detect obstacles in a vehicle's blind spot is to mount a camera on the vehicle to provide the operator with a visual image of obstacles in the vehicle's blind spot. However, this solution is complex and expensive, requiring a video camera and video monitor. Further, a video monitor can present a complex image, which, even if undistorted, can be difficult to interpret rapidly under stressful conditions that occur during heavy traffic conditions. Still further, monitors can be distracting. Moreover, like mirrors, such camera systems are less useful at night and under adverse weather conditions.

Another alternative to the use of mirrors is to direct radar transmissions toward each blind spot. Reflections of the radar transmissions can then be detected to determine the presence of obstacles in each of the blind spots. One such system is disclosed in U.S. Pat. No. 5,325,096, issued to Alan Packett and assigned to the owner of the present invention. These systems use a common radar transceiver that transmits a radio frequency (RF) signal into a blind spot of the vehicle. Obstacles that are present in that blind spot region reflect the transmitted signal. The frequency of the transmitted signal is compared with the frequency of a reflection of the transmitted signal which is received within the radar system to determine whether the reflected signal has been Doppler shifted. A Doppler shift in the frequency generally indicates that an obstacle is present in the blind spot.

However, one objection to such Doppler radar blind spot sensors is that objects that are stationary on the side of the road, such as road signs, guard rails, parked vehicles, etc. cause a "nuisance condition". That is, objects that the host vehicle (i.e, the vehicle equipped with the radar system) passes will cause the radar system to indicate the presence of these stationary objects in the host vehicle's blind spot even though they are not considered a threat. This can influence the operator of the host vehicle to lose faith in the usefulness of the radar and reduce the system effectiveness for warning the operator of real threats. In addition, such indications are distracting and irritating to the operator.

Accordingly, there is presently a desire for a simple and inexpensive solution to the problem of detecting hazardous obstacles in the blind spots of a vehicle. Such a solution should also be useful at night and under adverse weather conditions and should not generate nuisance conditions in response to objects that are stationary at the side of the road as the host vehicle passes. The present invention provides such a solution.

SUMMARY OF THE INVENTION

The present invention is a radar system that includes a means for distinguishing signals returned from (i.e., reflected by) objects that are stationary with respect to earth (i.e., "stationary objects") from signals returned from objects that are moving along with a host vehicle (i.e., the vehicle upon which the radar system is mounted). The system includes a radar antenna preferably having a relatively narrow beam width. The center of the beam is preferably aimed at a "squint" angle θ. The squint angle is defined as an angle (either forward or rearward) with respect to a line perpendicular to the direction of forward motion of the host vehicle. A signal is then received which has a first velocity component v that is parallel to the direction of forward motion of the vehicle, and a second velocity component u that is perpendicular to the direction of forward motion of the vehicle. The signal which is transmitted by the host radar system, reflected by an object, and then received by the antenna will have a frequency that is proportional to the magnitude of the composite vector (u,v) projected on the direction vector from the antenna. Accordingly, when the antenna is aimed such that the center of the beam is at a squint angle of θ=60°, the Doppler frequency of signals that are reflected from targets that are stationary along the roadside is significantly higher than the frequency of signals reflected from targets that are in the blind spot to the right-rear of the host vehicle and which are moving along with the host vehicle.

In light of the fact that signals that are reflected from stationary objects have characteristics (namely frequency and signal strength) that are distinct from signals that are reflected from objects moving along with the host vehicle, the invention allows the system to determine which signals have been reflected by stationary objects and which have been reflected by objects that are moving along with the host vehicle. This is important in determining whether to provide the operator of the vehicle with an indication that an object is present in the vehicle's blind spot, since stationary objects such as traffic signs, parked cars, guard rails, etc. which reflect radar signals back to the antenna cause "nuisance" indications to the operator. Therefore, in accordance with the present invention, only if the system determines that the object is moving along with the host vehicle will the radar system of the present invention generate an indication to the vehicle operator that an object is present in the vehicle's blind spot. Reflections of stationary objects will not cause the system to generate an indication that an object is present in the vehicle's blind spot. Preventing stationary objects from causing the radar system to generate nuisance indications when signals reflected from such stationary objects are received makes the present radar system far more useful and reliable than prior art systems that cannot distinguish stationary objects from objects that are moving along with the host vehicle.

In an alternative embodiment of the present invention, a first and second radar antenna are used to detect objects in a vehicle's blind spot. In accordance with one embodiment of the present invention, the first antenna is aimed approximately 60° from a line perpendicular to the direction of forward motion of the host vehicle. The second antenna is aimed such that the system will detect objects which are not detected by the first antenna. Alternatively, the two antennas are aimed such that the beams overlap, allowing the information that is gathered by each to be correlated in order to determine whether a detected object poses a threat.

In the preferred embodiment of the present invention, the boresight of the antennas is fixed at a particular squint angle. However, in an alternative embodiment, the antenna can be mechanically or electronically aimed to provide additional information to be used in distinguishing stationary objects from objects that are moving along with the host vehicle.

BRIEF DESCRIPTION OF THE DRAWINGS

FIGS. 5 and 6 show the effectiveness of using a large squint angle to strongly differentiate stationary objects and objects in the blind spot.

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The preferred embodiment of the present invention is a method and apparatus for detecting objects in a host vehicle's blind spot and generating an indication to the driver of the host vehicle that such an object is present only if the object is moving along with the host vehicle. The present invention will not generate such an indication if the object that is detected is stationary with respect to earth (i.e., is a "stationary" object).

Figure 1:
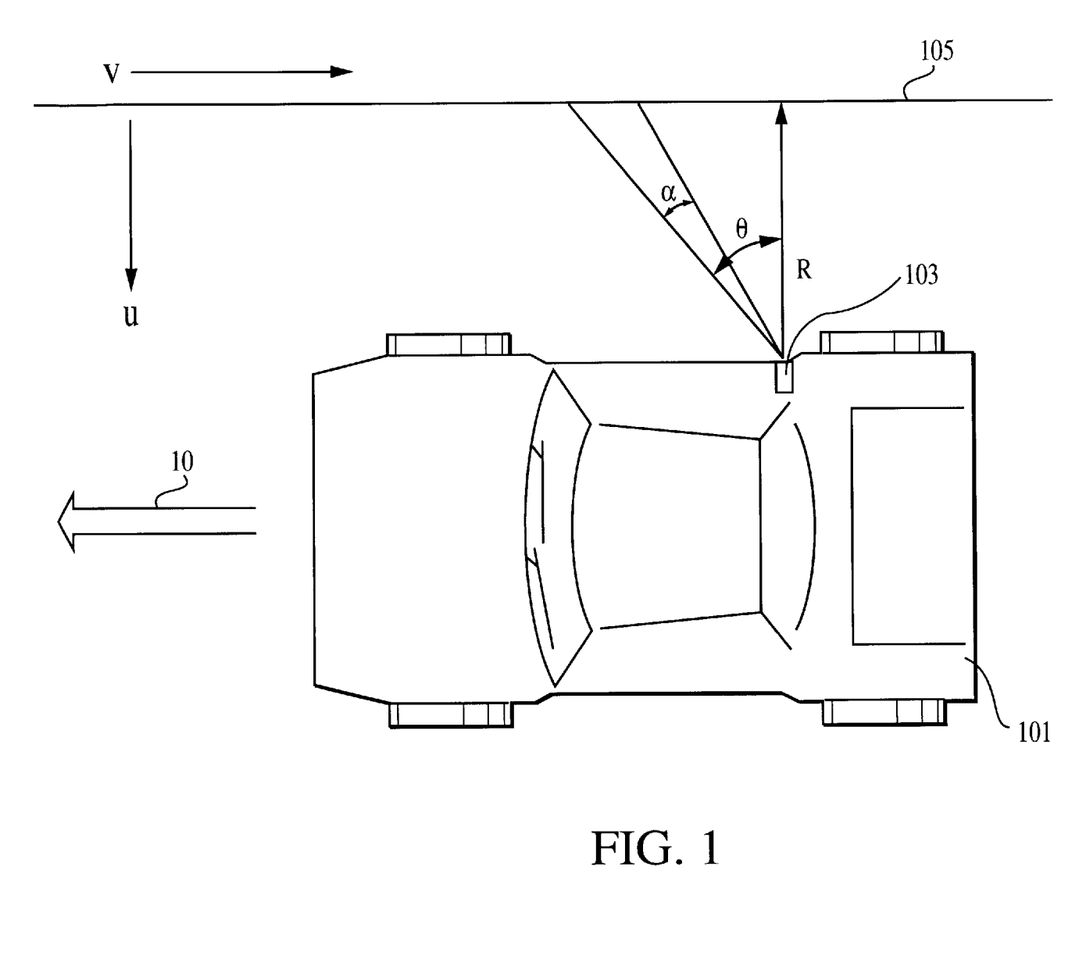
FIG. 1 is a simplified illustration of a host vehicle upon which a radar system in accordance with one embodiment of the present invention is mounted.
Figure 2:
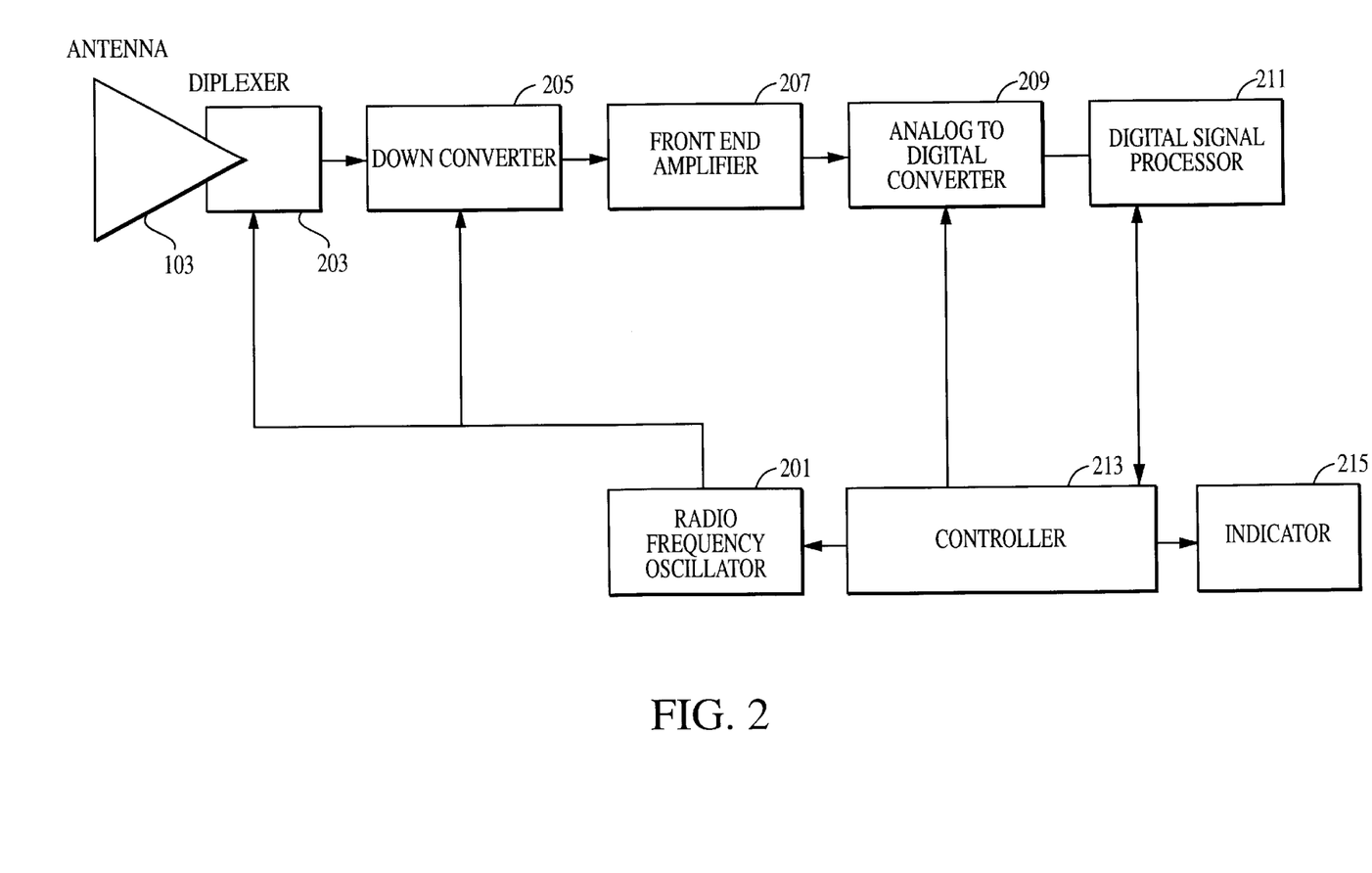
FIG. 2 is a simplified block diagram of a radar system in accordance with one embodiment of the present invention.

FIG. 1 is a simplified illustration of a host vehicle 101 upon which a radar system in accordance with one embodiment of the present invention is mounted. FIG. 2 is a simplified block diagram of a radar system in accordance with one embodiment of the present invention. A radio frequency (RF) signal is generated by an RF oscillator 201. The output from the RF oscillator 201 is coupled to a diplexer 203. The diplexer 203 routes the RF signal generated by the RF oscillator 201 to an antenna 103 to be transmitted at a beam width, α, of preferably approximately 15°–20°. The antenna 103 is preferably located along the side of the host vehicle 101, as shown in FIG. 1. The antenna is aimed such that the antenna boresight is at an angle $\theta$ of approximately 60° with respect to a line perpendicular to a forward direction of travel 10 of the host vehicle 101. As shown in FIG. 1, the antenna 103 is located to the rear of the host vehicle's blind spot and directed forward into the blind spot. However, in an alternative embodiment of the present invention, the antenna 103 may be mounted forward of the host vehicle's blind spot and directed rearward into the blind spot. As will be discussed in greater detail below, additional antennas may be provided to allow antennas with narrow beams to maintain complete coverage of the blind spot.

The signal that is transmitted from the antenna 103 is reflected by objects 105 that are within the transmission beam. If the host vehicle 101 is in motion with respect to the particular object 105, then the transmitted signal is reflected by such objects and at least some of the transmitted energy is returned and received by the antenna 103. The received signal is Doppler shifted proportional to the relative velocity of the object 105 with respect to the antenna 103 along the line between the object and the antenna 103. That is, the frequency of the received signal will be slightly higher than the transmitted signal if the object is moving toward the antenna 103 and slightly lower if the object is moving away from the antenna 103 due to the well-known Doppler effect. However, since the antenna 103 is directed at an angle θ with respect to the u-direction, the relative velocity in the v-direction will be detected to be equal to:

$$V\sin(\theta)=V_v;\qquad(1)$$

where V is the relative velocity of the object in the v-direction, and $V_v$ is that portion of the relative velocity V that will effect the frequency of the signal that is reflected back to the antenna 103 by the object 105. Equation (1) shows that only the component of the velocity in the direction that is perpendicular to the line between the antenna and the object will generate a Doppler shift in the signal received at the antenna.

Similarly, any relative motion of the object that occurs in the u-direction will be detected as being equal to:

$$U\cos(\theta)=V_u;$$

where U is the relative velocity of the object in the u-direction, and $V_u$ is that portion of the relative velocity U that will effect the frequency of the signal that is reflected back to the antenna 103 by the object 105.

The following assumptions can be made in order to simplify the analysis of the present invention. First, the object 105 that reflects the signal is assumed to have an extended cross-section, making the cross-section constant as a function of the angle θ. In addition, because the target subtends the entire beam pattern of the antenna, the gain needs to be expressed as a function of the angle θ. A Gaussian beam pattern is a relatively good first approximation of the function of the gain versus θ. Therefore, for the purpose of the present discussion, the power of the signal that is received can be simplified to:

$$P(\theta)=(G(\theta))^2/(R(\theta))^4;$$

wherein P (θ) is the power as a function of the angle θ; G (θ) is the antenna gain as a function of the angle θ; and R(θ) is the range as a function of the angle θ.

In addition, the range is a function of θ and is equal to:

$$R(\theta)=1/\cos(\theta)$$

The u-component of the reflected signal will predominate for objects that are moving along with the host vehicle. The v-component will predominate for stationary objects and will also produce a notably higher Doppler frequency.

Signals that are received by the antenna 103 are coupled by the diplexer 203 to a down converter 205. The RF oscillator 201 is coupled to the down converter 205 as the local oscillator for the down conversion of the received signal. Since the frequency of the RF oscillator is the same as the transmit signal frequency, the output from the down converter 205 is a "Doppler signal" which has a frequency equal to the Doppler shift which has occurred due to relative motion between the transmission and receipt of the reflected signal. This Doppler signal is preferably coupled from the down converter 205 to a front-end amplifier circuit 207 that amplifies and filters the Doppler signal. The amplified and filtered Doppler signal is then coupled from the front end 207 to an analog to digital (A/D) converter 209 which digitizes the Doppler signal to allow the Doppler signal to be processed in a digital signal processor (DSP) 211. The DSP 211 preferably performs a Fast Fourier Transform (FFT) on the Doppler signal to determine the amount of power that is present at each frequency within a limited range of frequencies of interest. A general-purpose controller 213 is coupled to the A/D converter 209 and to the DSP 211 to coordinate the activities of these two devices. In addition, the controller 213 determines whether the detected object is stationary or moving with the host vehicle (i.e., whether the object represents a threat to the operator of the host vehicle when changing lanes). The controller 213 may be any conventional microprocessor circuit or a discrete circuit, such as a state machine or other discrete logic that is dedicated to the tasks required. The controller 213 may be an application specific integrated circuit (ASIC) or may be incorporated within an ASIC having other additional circuitry. The controller 213 also preferably drives an indicator 215 or provides a signal to an indicator driver circuit (which for the purpose of the present description is integral to the indicator 215).

The radar signal may be modulated in order to make range information available. One such modulation technique is described in U.S. Pat. No. 5,302,956, issued to Asbury, et al. and assigned to the assignee of the present invention, which is hereby incorporated by reference. In accordance with this technique, the radar signal is frequency shift keyed to transmit two discrete frequencies. The phase difference between the doppler shift that occurs at these frequencies is then used to determine the range of an object that reflects the transmitted signals.

Other modulation techniques may be employed in the side-looking radar system. These include phase modulation, spread spectrum modulation, pulse doppler modulation and other types of frequency modulation.

However, for the sake of simplicity, the present invention is described herein as a basic Doppler radar system for detecting objects that are both stationary and moving, and for distinguishing between them. Further, by determining the range of an object at two different times, the relative velocity can be determined. Once the relative velocity of the object is determined, this velocity can be compared with the host vehicle's velocity to determine whether a detected object is stationary or moving. If stationary, the present invention will not indicate the presence of the object.

Figure 3:
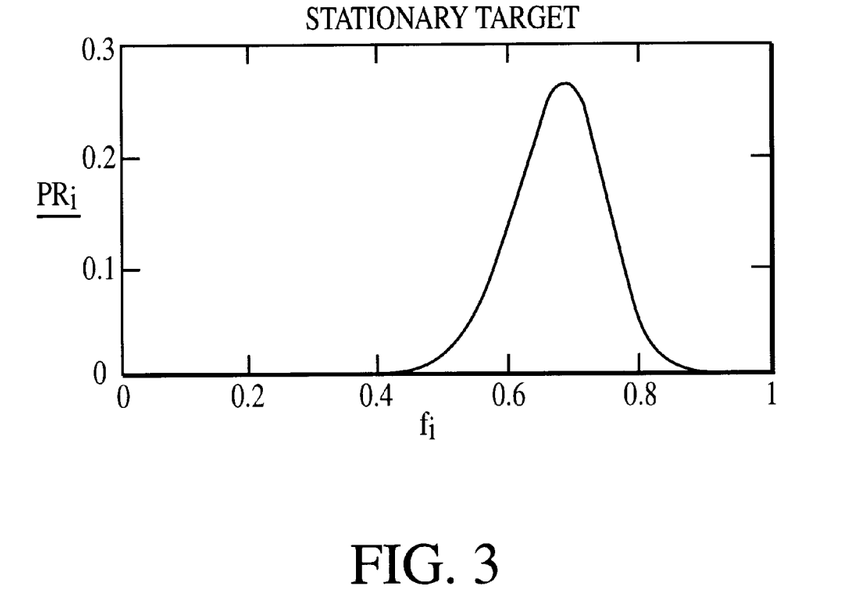
FIG. 3 is a plot of the predicted normalized shape of the power spectral density, $PR_i$ of the received signal versus the Doppler frequency, $f_i$ of a stationary object with a "squint" angle $\theta$ of 45° and a beam width of 20°.
Figure 4:
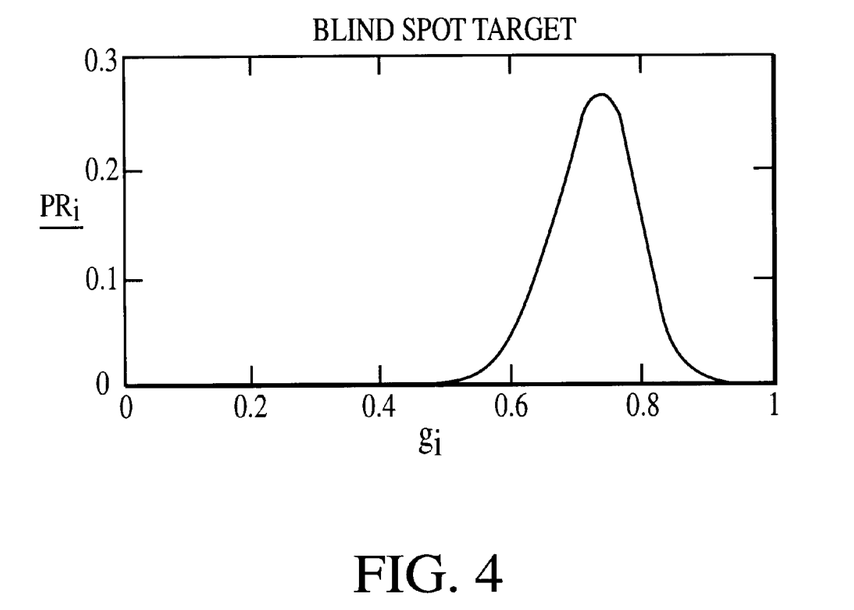
FIG. 4 is a plot of the predicted normalized shape of the power spectral density $PR_i$ of the received signal versus the Doppler frequency, $g_i$, of an object moving along with the host vehicle and having a squint angle $\theta$ of 45° and a beam width of 20°.

FIG. 3 is an idealized normalized (to speed) plot of the power spectral density, $PR_i$ of the received signal versus the Doppler frequency, $f_i$ of a stationary object with a "squint" angle θ of 45° and a beam width of 20°. The squint angle is defined as an angle (either forward or rearward) with respect to a line perpendicular to the direction of forward motion of the host vehicle. FIG. 4 is a similar plot of the power spectral density $PR_i$ of the received signal versus the Doppler frequency, $g_i$, of a stationary object with a squint angle θ of ±45° and a beam width of 20°. By comparing the plots of FIGS. 3 and 4, it can be seen that with a 45 degree squint angle there is only a slight difference between the Doppler frequency of a stationary object and that of a moving object.

Figure 5:
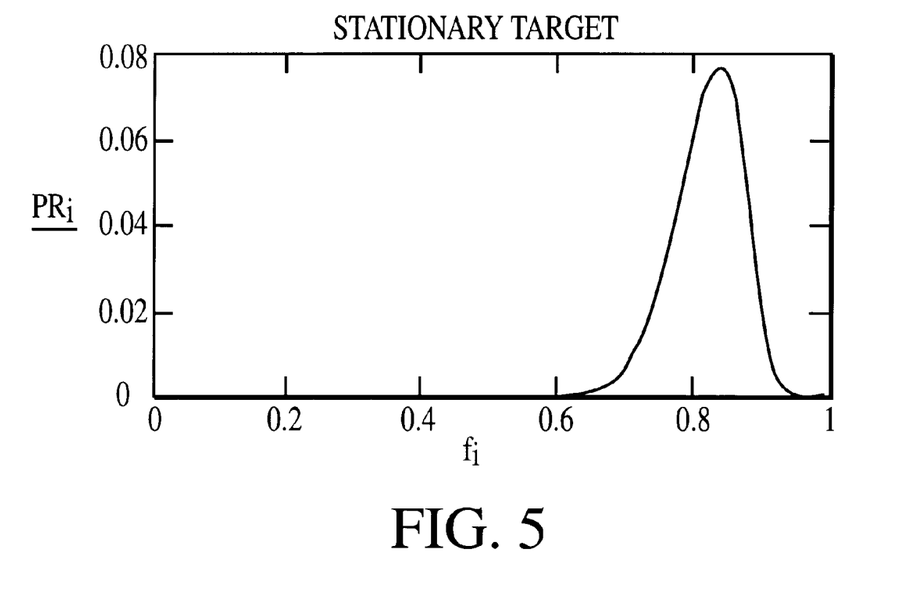
FIG. 5 shows the predicted normalized spectrum of FIG. 3 with the antenna squinted at an angle of 60°.
Figure 6:
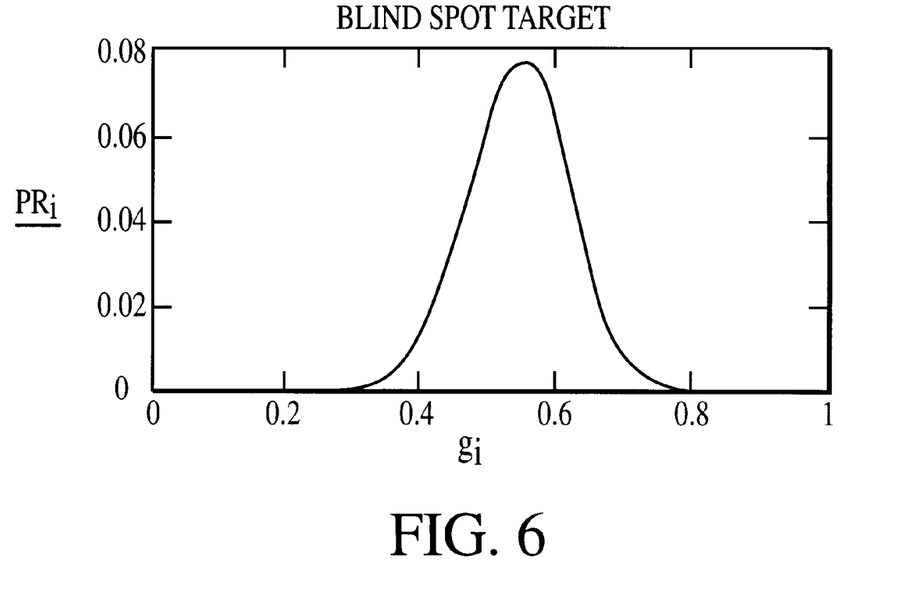
FIG. 6 shows the predicted normalized spectrum of FIG. 4 with the antenna squinted at an angle of 60°.

However, as shown in FIGS. 5 and 6, the difference between the Doppler frequency of signals reflected by a stationary target and a target in the host vehicle's blind spot is far greater if the squint angle θ of the antenna 103 is increased to approximately 60°. This difference increase is due to the increased differing amount of the u-component and the v-component present in the received signal as the squint angle increases.

Figure 7A:
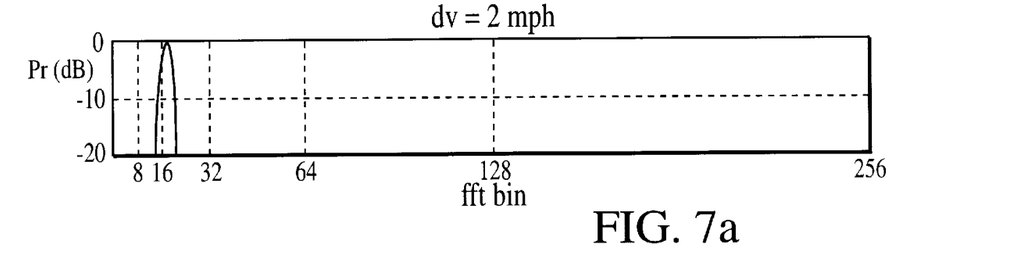
FIGS. 7a–7d are plots of power in each of 256 possible FFT bins representing spectral power density of received reflections from objects moving at relative velocities of 2, 5, 10, and 15 miles/hour, respectively, as determined by a computer model.
Figure 7B:
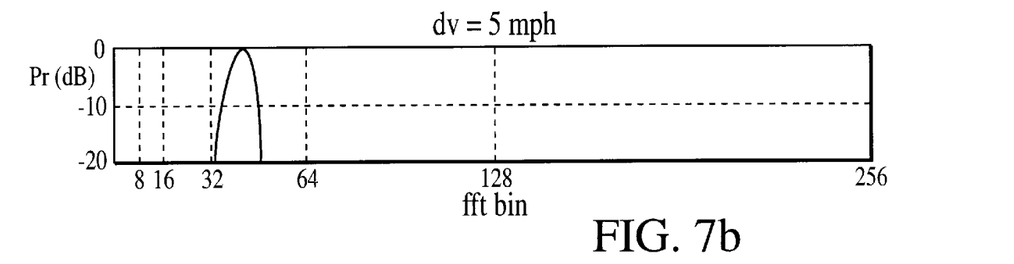
Figure 7C:
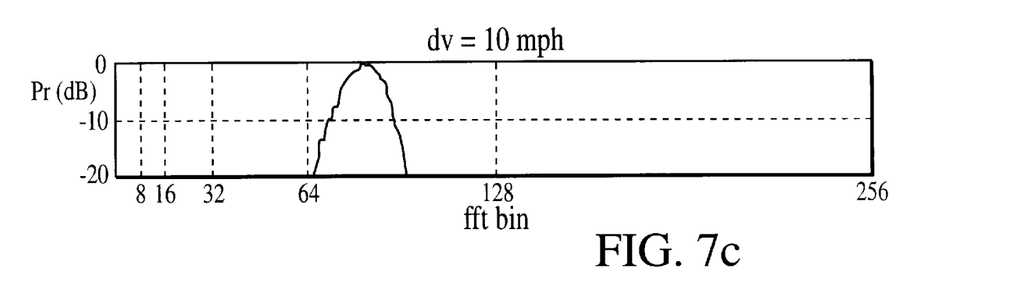
Figure 7D:
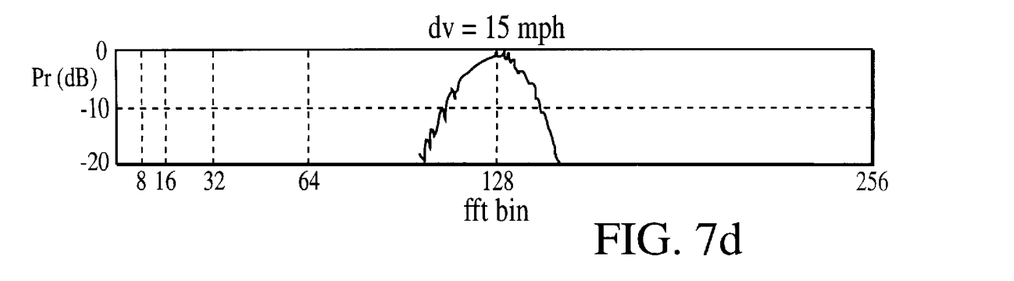
Figure 8A:
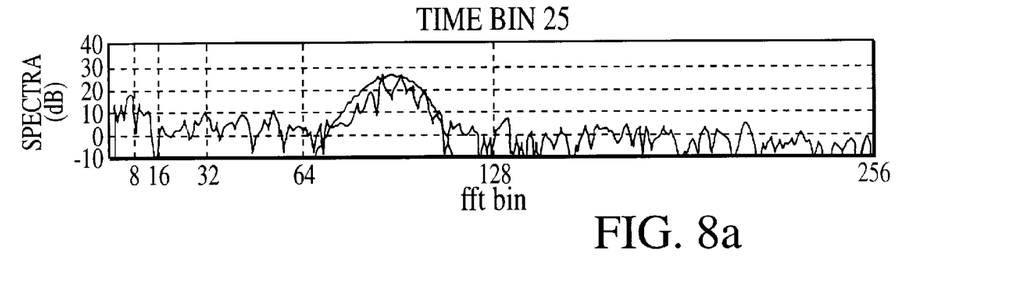
FIGS. 8a–8d are data plots of power in each of 256 actual FFT bins representing spectral power density of received reflections from a row of grocery carts in a shopping center parking lot. The data represent four sequential FFT's that are processed by the Radar DSP.
Figure 8B:
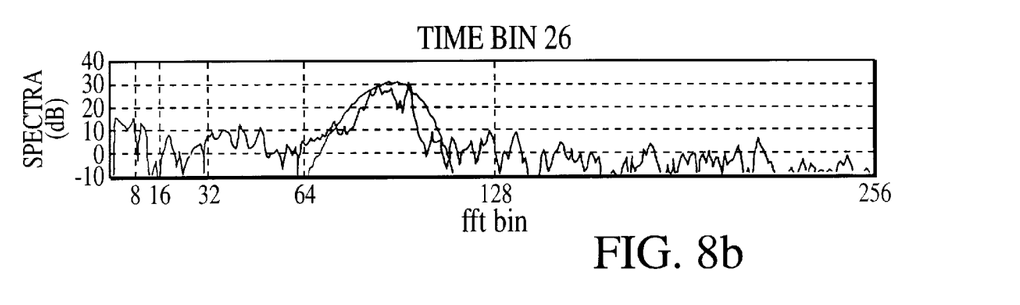
Figure 8C:
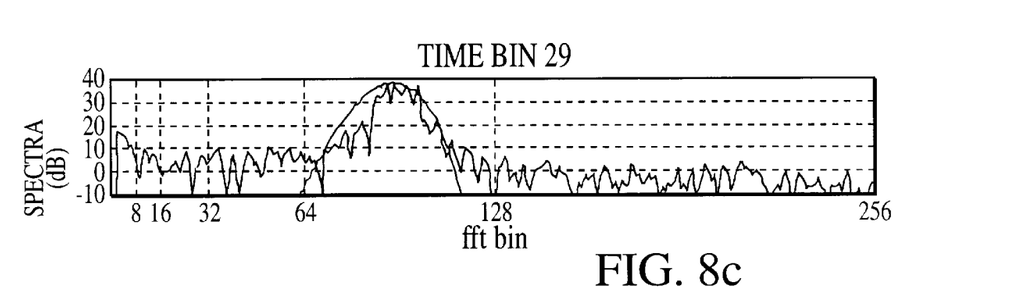
Figure 8D:
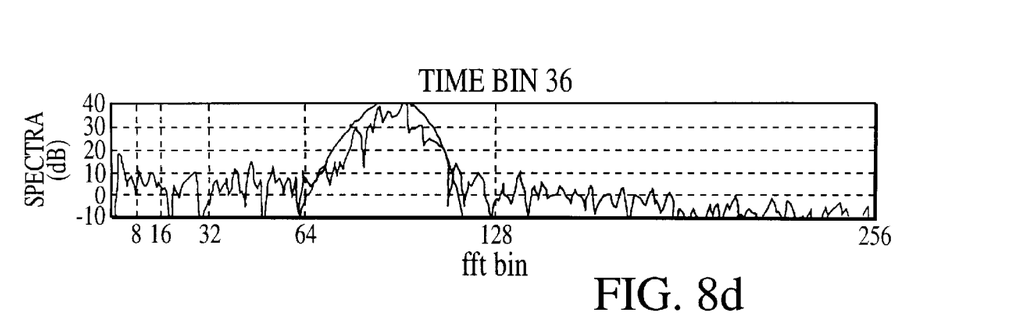
Figure 9A:
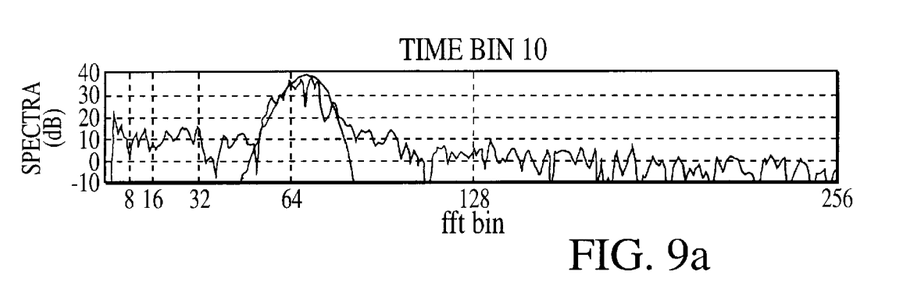
FIGS. 9a–9d are data plots of power in each of 256 actual FFT bins representing spectral power density of received that are received reflections from a row of parked cars in a parking lot.
Figure 9B:
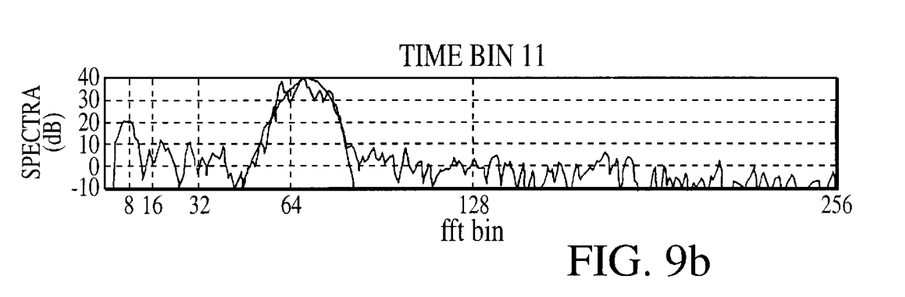
Figure 9C:
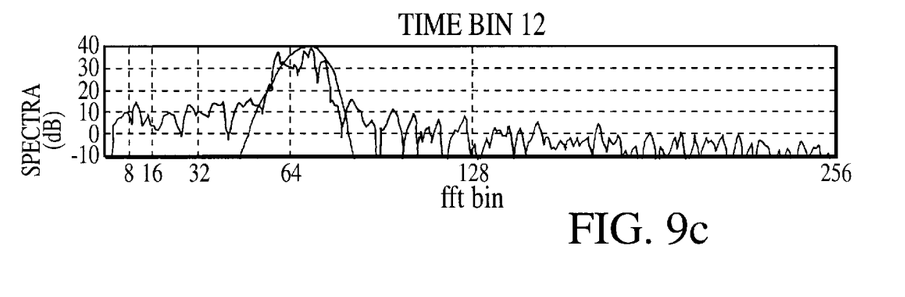
Figure 9D:
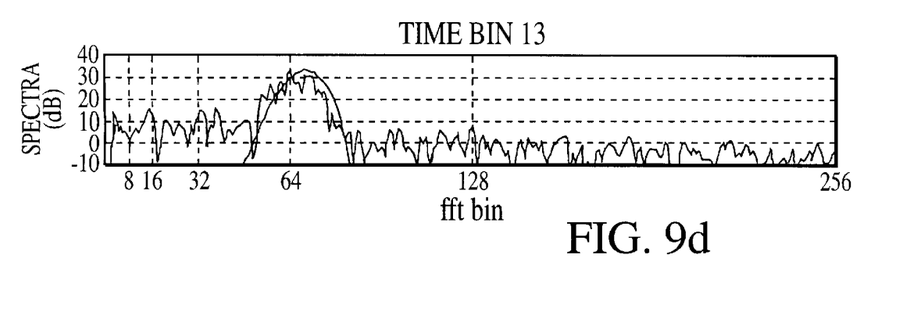
Figure 10A:
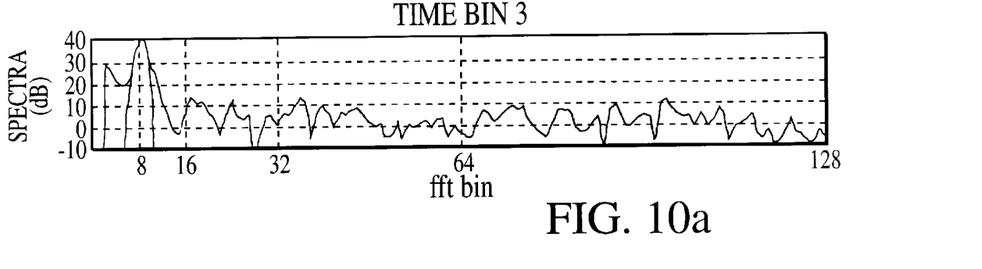
FIGS. 10a–10d are plots of power in each of 256 actual FFT bins representing spectral power density of received reflections from a car moving along with the host vehicle in the right rear blind spot.
Figure 10B:
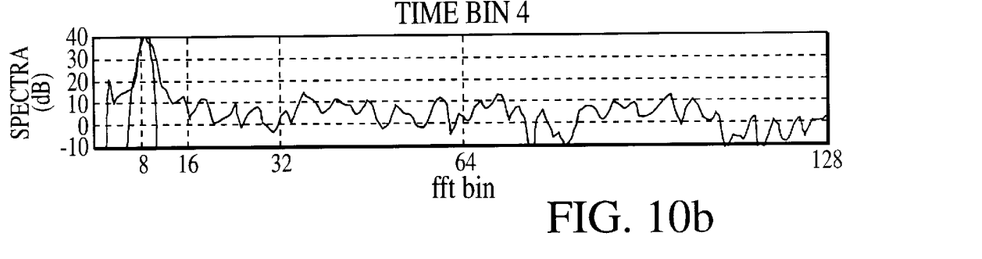
Figure 10C:
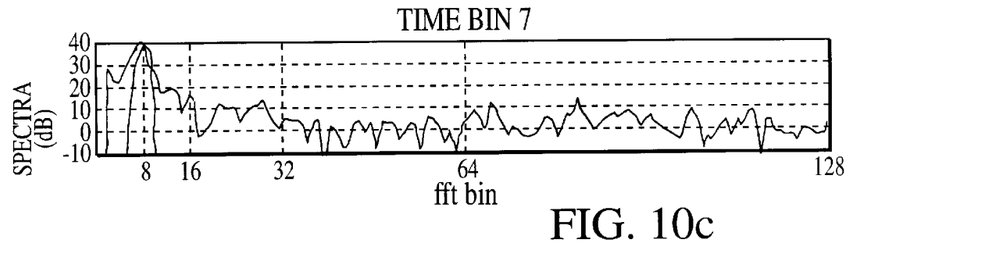
Figure 10D:
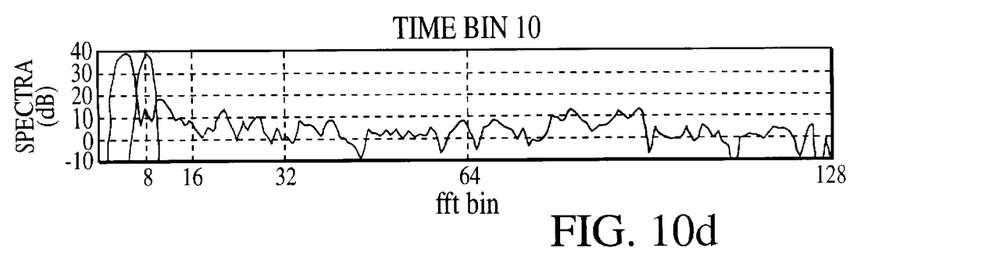

Unnormalized plots of received power versus the frequency (as determined by the particular FFT bin in which the power is detected) are provided in FIGS. 7a–7d. These predictions were made for the purpose of demonstrating the effect of vehicle speed on the spectrum characteristics. At higher speeds, the center frequency increases as does the spectral width. As shown in FIG. 7a, for an object that is moving at approximately 2 miles/hour with respect to the host vehicle, a signal will be received that has power essentially concentrated in FFT bin number 17. This indicates that the Doppler frequency of the received signal will be relatively low. In FIG. 7b, a plot of the power density with respect to frequency is shown of an object that is moving at a relative velocity of 5 miles per hour with respect to the host vehicle. It can be seen from the plot of FIG. 7b that the power is essentially concentrated in FFT bin number 40. FIG. 7c is a plot of the power density with respect to frequency received after reflecting from an object that is moving at a velocity of 10 miles/hour with respect to the host vehicle. The power is shown to be concentrated approximately in FFT bin number 80. FIG. 7d, a plot of the power density with respect to frequency is shown of an object that is moving at a relative velocity of 15 miles per hour with respect to the host vehicle. It can be seen from the plot of FIG. 7d that the power is essentially concentrated in FFT bin number 128.

These predictions can be seen to be very accurate in most cases, as is shown by the comparisons of the computer generated mathematical models to actual data plotted in FIGS. 8a–8d, 9a–9d, and 10a–10d. FIGS. 8a–8d show predicted data versus actual data for a row of grocery carts which is placed in the blind spot of the host vehicle. FIGS. 9a–9d show predicted data versus actual data for a line of parked cars as the host vehicle passes. FIGS. 10a–10d show predicted data versus actual data for another vehicle riding along in the host vehicle's blind spot. These plots verify that there is a substantial difference in both power over time and Doppler frequency, thus allowing a system in accordance with the present invention to distinguish stationary objects from objects moving along with the host vehicle.

Because the amount of power and the Doppler frequency of stationary objects differs from that of targets moving along with the host vehicle, the present invention uses this information to identify objects as being either stationary or moving. If an object is identified as being stationary, then the system will not indicate that there is an object present in the host vehicle's blind spot. On the other hand, if the system determines that the object is moving with the host vehicle, then the system will indicate the presence of an object in the host vehicle's blind spot in order to warn the driver of the host vehicle of the presence of the object.

Figure 11:
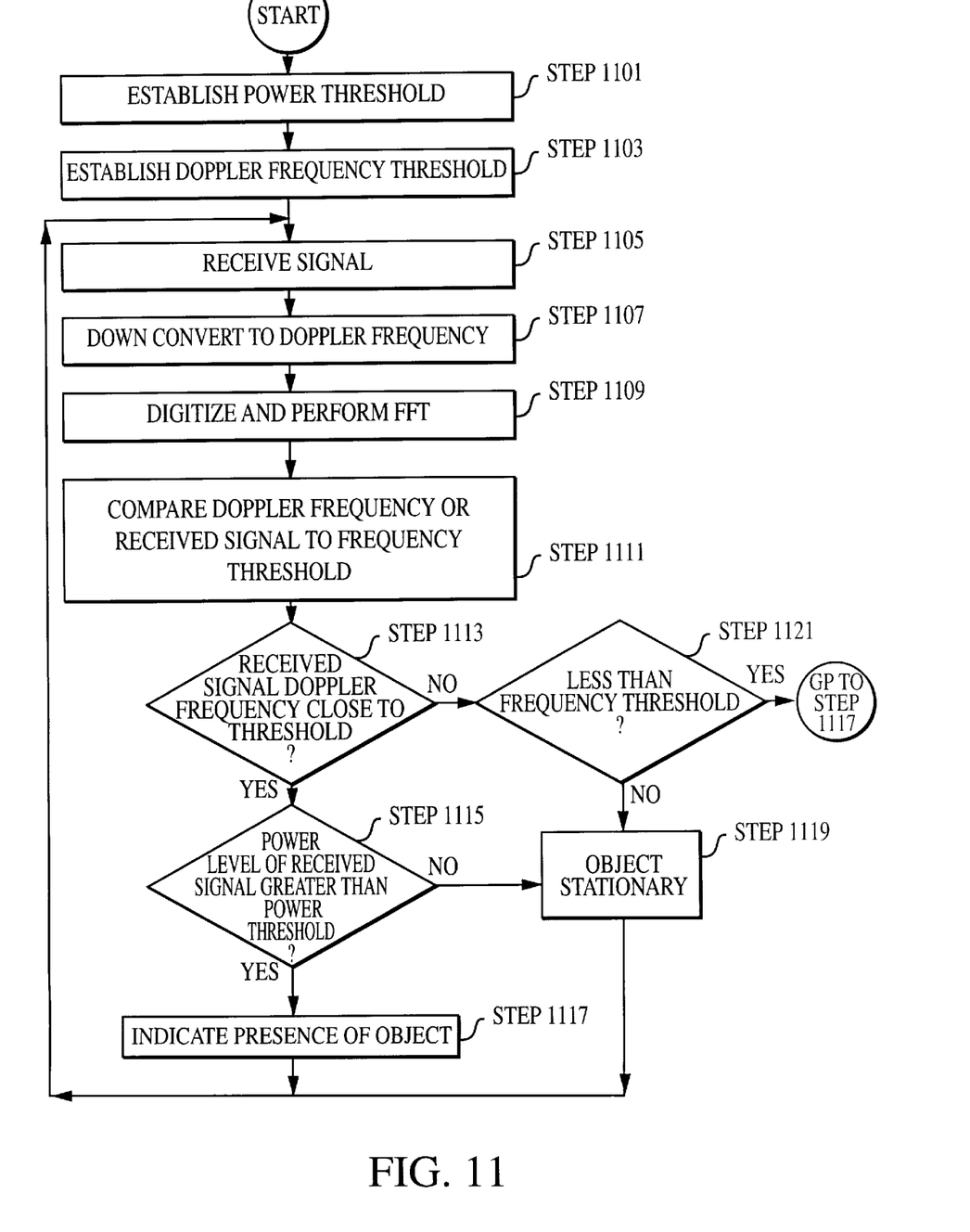
FIG. 11 is a flow chart of the process by which the present invention distinguishes between stationary objects and objects that are moving along with the host vehicle.

FIG. 11 is a flow chart of the process by which the present invention distinguishes between stationary objects and objects that are moving along with the host vehicle. Initially, a power threshold is established (STEP 1101). In addition, a Doppler frequency threshold is established (STEP 1103). A reflection of the transmit signal is then received (STEP 1105). The received signal is down converted to a Doppler signal (STEP 1107). The Doppler signal is then digitized and an FFT is performed to determine the amount of power at each frequency of interest (STEP 1109). Once the Doppler signal has been digitized and the FFT performed, the frequency about which most of the power is concentrated is determined (i.e., the Doppler frequency of the received signal is determined) and compared with the frequency threshold (STEP 1111). If the Doppler frequency is close to the threshold frequency (STEP 1113), then a determination is made as to whether the power level of the received signal is greater than the power threshold (STEP 1115). If so, then the system will indicate the presence of an object in the host vehicle's blind spot (STEP 1117). If the power level of the received signal is not greater than the power threshold, then the system will consider the object from which the signal was reflected to be stationary and will not indicate the presence of an object in the host vehicle's blind spot (STEP 1119). However, if the frequency of the Doppler signal is not close to the frequency threshold (STEP 1113), and is less than the frequency threshold (STEP 1121), then the presence of an object in the host vehicle's blind spot will be indicated without regard from the amount of power received (STEP 1117).

In the embodiment shown in FIG. 11, if the Doppler frequency is not less than the frequency threshold (STEP 1121), then the Doppler frequency of the received signal is assumed to be far greater than the frequency threshold and the object that has reflected the signal is considered to be stationary. Accordingly, the system does not indicate the presence of an object in the host vehicle's blind spot (STEP 1119). The system then waits until the next signal is received (STEP 1105) and begins the processing of that next signal in the same manner as described above.

In one alternative embodiment of the present invention, the antenna may be dynamically directed to change the angle at which the boresight of the antenna is aimed. For example, in one embodiment of the present invention, the antenna is mechanically aimed at a squint angle θ of approximately 60° for a first predetermined period of time, and at a squint angle of θ equals 0° for a second predetermined period of time. Accordingly, a signal that is received during the second predetermined period can be used as a reference in determining whether the signal received during the first period has been reflected by a stationary object or an object that is moving along with the host vehicle. This can be understood by noting that the amount of u component is essentially reduced to zero when the boresight of the antenna 103 is aimed at a squint angle of 0°. However, when the boresight is redirected to a squint angle of 60° the contribution of the u component is substantial. Therefore, by either redirecting the antenna or by using two antennas, the contribution of the u component can be more readily identified.

It will be clear to those skilled in the art that the antenna can be either electronically or mechanically redirected. That is, by using phased array techniques, the squint angle θ can be electronically controlled without mechanically moving the antenna. In yet another embodiment of the present invention, the antenna may be provided with more than one antenna, each such antenna being aimed in a different direction.

Figure 12:
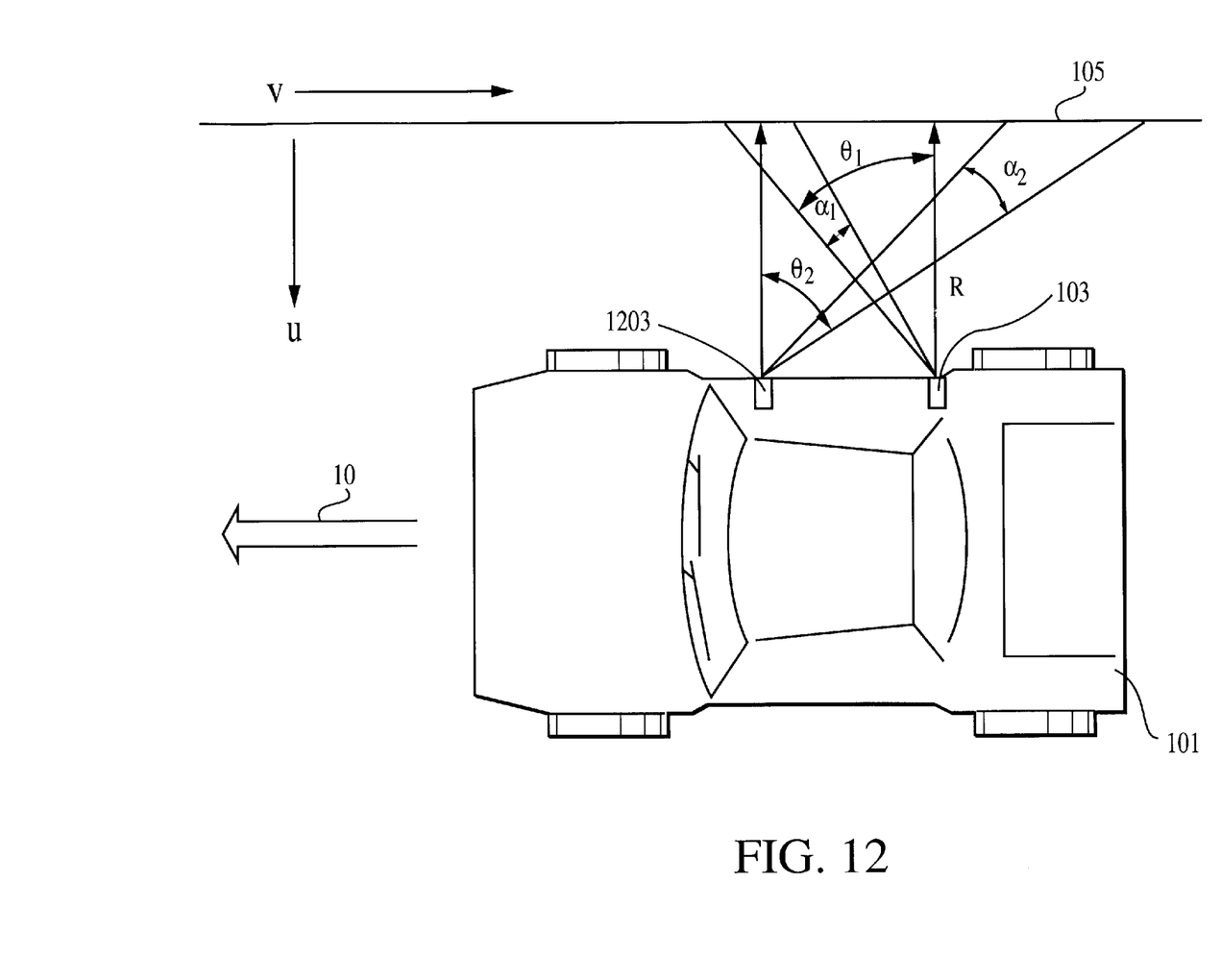
FIG. 12 is a simplified illustration of a host vehicle upon which a radar system in accordance with one embodiment of the present invention is mounted.

In yet another embodiment of the present invention, shown in FIG. 12, two antennas 103, 1203 are used concurrently. The first antenna 103 is preferable aimed at a squint angle of greater than 45° and preferably approximately 60°. The second antenna 1203 is preferably aimed at a squint angle that ensures that objects that are outside the beam of the first antenna 103 are within the beam of the second antenna 1203. The signals received by each of these two antennas 103, 1203 are separately processed to determine the relative velocity of objects that reflect a transmitted radar signal. While the two antennas are shown in FIG. 12 to be placed at different locations along the side of the host vehicle, it should be understood that these two antennas 103, 1203 may be located at the same location. In accordance with one embodiment of the present invention, the same hardware may be used to receive and process the signals received by each antenna by time multiplexing the transmissions. That is, during alternating first and second periods the first and second antennas are used, respectively. During first periods, a signal is transmitted and the reflections are received using the first antenna 103. During second periods of time, a signal is transmitted and the reflections of this second transmit signal are received using the second antenna 1203. In one such embodiment, the controller 213 causes the RF oscillator 201 to output transmit signals to the first antenna 103 during the first periods and to output transmit signals to the second antenna 1203 during the second periods. Likewise, the controller 213 receives an output from the DSP 211 during the first period which corresponds to the signal received during that first period and receives an output from the DSP 211 during the second period which corresponds to the signal received during that second period. Alternatively, discrete hardware may be provided for transmitting and processing the signals through the first and second antennas.

For extended objects, such as guard rails, that are stationary in the v-direction will be detected in opposite directions by each of the two antennas. However, motion in the u-direction will be detected as being in the same direction. In accordance with one embodiment of the present invention, this information may be used to assist in determining whether an object is stationary or moving along with the host vehicle.

The use of two uniquely directed radar beams, whether originating from one location or from two or more locations, allows the controller 213 of the present invention to correlate the radar signals that are received. Correlating the radar signals received by each beam makes it possible to determine the relative velocity of objects detected with respect to the host vehicle. For example, if an object is detected by one such radar beam at a first point in time and then by another beam at a second point in time and if the distance between two points at which the object is detected is known and the time at which the object is detected at each of the two points is known, then the relative velocity of the object with respect to the host vehicle can be calculated. In accordance with one embodiment of the present invention, the approximate location of objects detected by each beam is essentially known, since the beam is preferably relatively narrow and only objects that are within one traffic lane (i.e., approximately 15 feet) are considered. One means by which the present invention limits consideration to only those objects that are within one traffic lane of the host vehicle 101 is to require that the power returned to the antenna to be above a threshold value. Alternatively, the range of each detected object can be detected by the radar system by modulating the transmit signal appropriately. Accordingly, if the amount of time between detection of an object by a first and second beam is known, then the relative velocity of the object can be calculated.

Once the relative velocity of an object is known, the controller 213 can compare the relative velocity of the object to the velocity of the host vehicle to determine whether the object is stationary. In accordance with the present invention, the controller 213 will only drive the indicator to indicate the presence of an object if the object is not stationary.

In summary, a number of embodiments of the present invention have been described. Nevertheless, it will be understood that various modifications may be made without departing from the spirit and scope of the invention. For example, the present invention is described as having an A/D converter and digital signal processor. However, the present invention may be implemented using strictly analog circuitry. Furthermore, while the present invention is shown to have a controller that controls the operation of the DSP and the A/D converter, an alternative embodiment of the present invention need not have such a controller. Accordingly, it is to be understood that the invention is not to be limited by the specific illustrated embodiments, but only by the scope of the appended claims.

Accordingly, it is to be understood that the invention is not to be limited by the specific illustrated embodiment, but only by the scope of the appended claims.

What is claimed is:

1. A method for determining whether an object detected by a radar system is stationary or moving with respect to a host vehicle, including the steps of:
   (a) transmitting a signal at a squint angle greater than approximately 45°;
   (b) receiving a reflection of the transmitted signal;
   (c) determining the amount of power at selected frequencies present in the received reflection of the transmitted signal;
   (d) establishing a predetermined frequency threshold; and
   (e) determining that an object from which the received reflection of the transmitted signal has reflected is stationary if the power is essentially concentrated at a frequency above the predetermined frequency threshold.

2. The method of claim 1, wherein the squint angle is approximately 60°.

3. The method of claim 1, further including the step of indicating that the object is present if the object is determined not to be stationary, and not indicating that the object is present if the object is determined to be stationary.

4. The method of claim 1, wherein the transmit signal is a radio frequency signal.

5. The method of claim 1, further including the steps of:
   (a) establishing a power threshold level;
   (b) determining whether the frequency of the received reflection of the transmitted signal is within a predetermined range of the frequency threshold; and
   (c) if the frequency of the received reflection of the transmitted signal is within the predetermined range of the frequency threshold, then determining that the object from which the received reflection of the transmitted signal has reflected is stationary if the sum of the power within preselected frequencies is greater than the power threshold level.

6. A method for determining whether an object is stationary with respect to a host vehicle on which a radar system is mounted, including the steps of:
   (a) directing a boresight of an antenna at a first squint angle of greater than approximately 45°;
   (b) transmitting a first transmit signal from the antenna during a first period of time;
   (c) determining the amount of power received by the antenna at selected predetermined frequencies during the first period of time;
   (d) changing the direction of the boresight of the antenna to a second squint angle of less than 45°;
   (e) transmitting a second transmit signal from the antenna during a second period of time;
   (f) determining the amount of power received by the antenna at the second squint angle of less than 45° and at selected predetermined frequencies during the second period of time; and (g) comparing the frequency of the signal received during the first period of time with the signal received during the second period of time to determine whether an object from which the received signal has reflected is stationary.

7. The method of claim 6, wherein the first squint angle is approximately 60°.

8. The method of claim 6, further including the step of indicating that the object is present if the object is determined not to be stationary, and not indicating that the object is present if the object is determined to be stationary.

9. A side-looking radar system for detecting the presence of an object in the blind spot of a host vehicle upon which the radar system is mounted, including:

(a) a radar transmitter for transmitting a radar signal;

(b) a radar receiver for detecting reflections of the transmitted radar signal;

(c) a processor, coupled to the radar receiver, capable of determining relative motion of an object from which the received reflections have been reflected, the motion being relative to the motion of the host vehicle, in order to determine whether the object is present and that the object is not stationary with respect to earth; and (d) an indicator, coupled to the processor, the indicator receiving from the processor an indication that an object is present and is not stationary with respect to earth, the indicator being capable of indicating to an operator of the host vehicle that the object is present and is not stationary.

10. The side-looking radar system of claim 9, wherein the indicator indicates by an audible indication to the operator.

11. The side-looking radar system of claim 9, wherein the indicator indicates by a visual indication to the operator.

12. The side-looking radar system of claim 9, further including a first antenna directed at a squint angle of greater than 45°.

13. The side-looking radar system of claim 12, wherein the squint angle of the first antenna is approximately 60°.

14. The side-looking radar system of claim 12, further including a second antenna directed at a squint angle of less than −45°.

15. The side-looking radar system of claim 14, wherein the squint angle of the second antenna is approximately −60°.

16. A side-looking radar system for detecting objects in a blind spot of a host vehicle upon which the side-looking radar system is mounted, the side-looking radar system including:

(a) a Doppler radar circuit for:
  (1) transmitting a radar signal;
  (2) receiving reflections of the transmitted radar signal;
  (3) detecting a Doppler shift that has occurred between the transmission and reception of the transmitted radar signal; and
  (4) determining the amount of power at each Doppler frequency of the received reflections; and (b) a controller, coupled to the Doppler radar circuit, for:
  (1) determining whether the objects from which the received reflections have reflected are stationary or are moving along with the host vehicle; and
  (2) providing an indication that a hazard is present only if the object is detected and determined not to be stationary.

17. The side-looking radar system of claim 16, wherein the controller determines whether the object from which the received reflections have reflected is stationary based upon the Doppler frequency of the received reflections.

18. The side-looking radar system of claim 17, wherein the controller further determines whether the object from which the received reflections have reflected is stationary based upon the amount of power at each Doppler frequency of the received reflections.

19. The side-looking radar system of claim 17, wherein the controller further determines whether the object from which the received reflections have reflected is stationary based upon the Doppler shift of the radar signal.

20. The side-looking radar system of claim 16, further including a first antenna directed at a squint angle of greater than 45°.

21. The side-looking radar system of claim 20, wherein the squint angle of the first antenna is approximately 60°.

22. The side-looking radar system of claim 20, further including a second antenna directed at a squint angle of less than −45°.

23. The side-looking radar system of claim 21, wherein the squint angle of the second antenna is approximately −60°.

* * * * *

UNITED STATES PATENT AND TRADEMARK OFFICE
CERTIFICATE OF CORRECTION

PATENT NO. : 6,121,916
DATED : September 19, 2000
INVENTOR(S) : James C. McDade

It is certified that error appears in the above-identified patent and that said Letters Patent is hereby corrected as shown below:

<u>Column 10,</u>
Line 47, please delete "preselected frequencies is greater than" and replace it with -- preselected frequencies is not greater than --.

Signed and Sealed this

Sixteenth Day of April, 2002

Attest:

JAMES E. ROGAN
*Attesting Officer*     *Director of the United States Patent and Trademark Office*